June 16, 1925.                                                          1,542,662
J. BRENZINGER
CAN BODY AND METHOD FOR PRODUCING SAME
Original Filed March 1, 1921
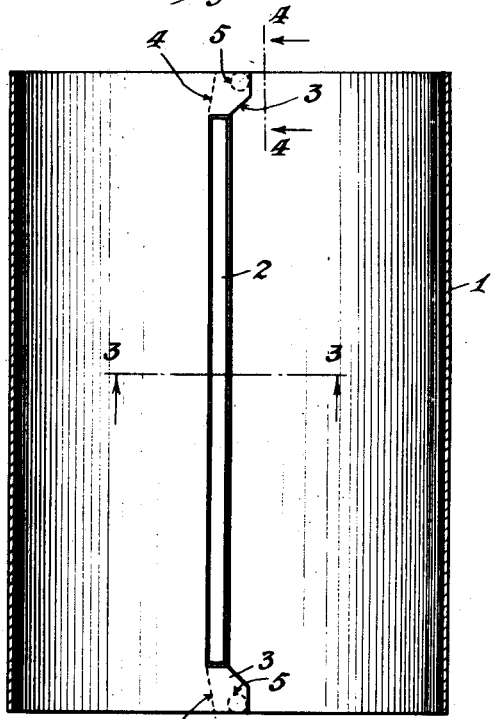
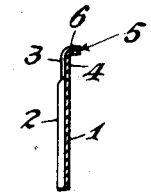
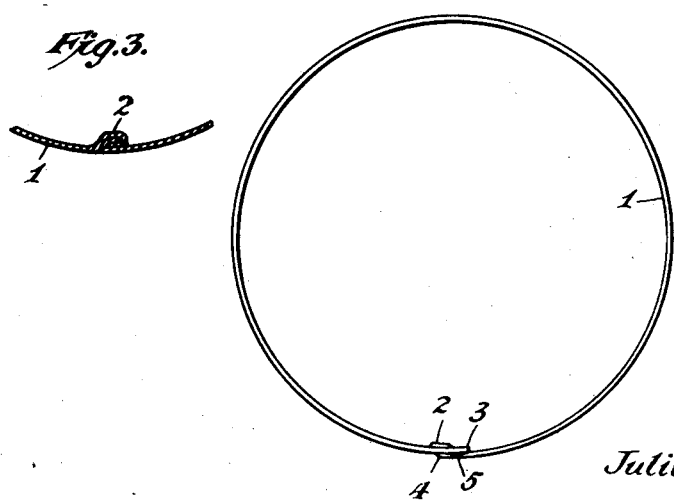
INVENTOR
Julius Brenzinger
BY
ATTORNEY Patented June 16, 1925.

1,542,662

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

CAN BODY AND METHOD FOR PRODUCING SAME.

Continuation of application Serial No. 448,827, filed March 1, 1921. This application filed January 22, 1923. Serial No. 614,337.

*To all whom it may concern:*

Be it known that I, JULIUS BRENZINGER, a citizen of the United States, and a resident of Fairfield, in the county of Fairfield and State of Connecticut, have invented certain new and useful Can Bodies and Methods for Producing Same, of which the following is a specification.

This application is a continuation of application Ser. No. 448,827, filed March 1, 1921.

This invention relates to a can body and to the method of producing same.

In the production of bodies of this character, it is customary to turn their ends over into flange formation and, in so doing, the metal at the bend, is stretched on one side and compressed on the other the result being that there is a tendency of the lapped edges of the layers of metal to move one with respect to the other and the strain thus produced frequently causes the solder to give way so that an opening is formed of dimensions so minute that it will not be discovered until fermentation sets up within the filled can and forces out some of its contents.

The main object and feature of this invention is to obviate this condition.

In the accompanying drawings, the invention is embodied in a concrete and preferred form in which—

Fig. 1 is a vertical sectional view of a can body produced according to my invention;

Fig. 2 is a bottom plan view of Fig. 1;

Fig. 3 is a detail sectional view on the plane of line 3—3 of Fig. 1; and

Fig. 4 is a detail sectional view on the plane of line 4—4 of Fig. 1 but showing the end of the body flanged.

The body 1 of the can is formed from a blank, the ends of which are brought together and interlocked by means of a seam 2 that extends the major portion of the length of the body but terminates short of its ends, as shown. At the ends of the body, the adjacent edges 3 and 4 of the metal lie in overlapped and unseamed relation so that an undue thickness will not be produced at the point where the top is seamed to the body. 5 indicates an electric weld such as a spot weld or a short line weld securing the lapped edges 3 and 4 together and I have found that by this means the layers of metal or lapped edges are held immovable when the end of the body is flanged outwardly as at 6 in Fig. 4.

The electric weld destroys the tin covering of the body at the point where it is applied and should therefore be sufficiently remote from the contents of the can, when filled, to prevent the food from coming in contact therewith, and it is preferred to locate this electric weld at the extreme end of the body and on that portion of it that will later become flange 6.

If solder is to be applied, the body is formed as above described by means of a side seam and electric welding, after which soldering takes place in the usual way and then the flange is bent outwardly.

I claim:

1. The method of producing a can body, which consists in interlocking opposed edges of a blank by means of a side seam extending the major central portion of the length of the body, and in overlapping the opposed edges of the blank at the end portions thereof, and in permanently securing the overlapped end portions together by electrically welding the same.

2. A can body having a side seam extending the major central portion of its length and unseamed portions at its ends formed by overlapping edges, the unseamed overlapped edges being permanently connected by electric welds at the ends of the body.

3. A can body having a side seam extending the major central portion of its length and unseamed portions at its ends formed by overlapping edges, the unseamed overlapped edges being permanently connected by electric welds at the ends of the body and bent over into flange formation.

4. A can body having a side seam extending the major central portion of its length and unseamed portions at its ends formed by overlapping edges, the unseamed overlapped edges being permanently connected by electric welds at the end of the body, and a body of solder covering the seamed portion and the overlapped edges of the body.

Signed at Bridgeport, in the county of Fairfield and State of Connecticut, this 17 day of January, 1923.

JULIUS BRENZINGER.